Figure 1:
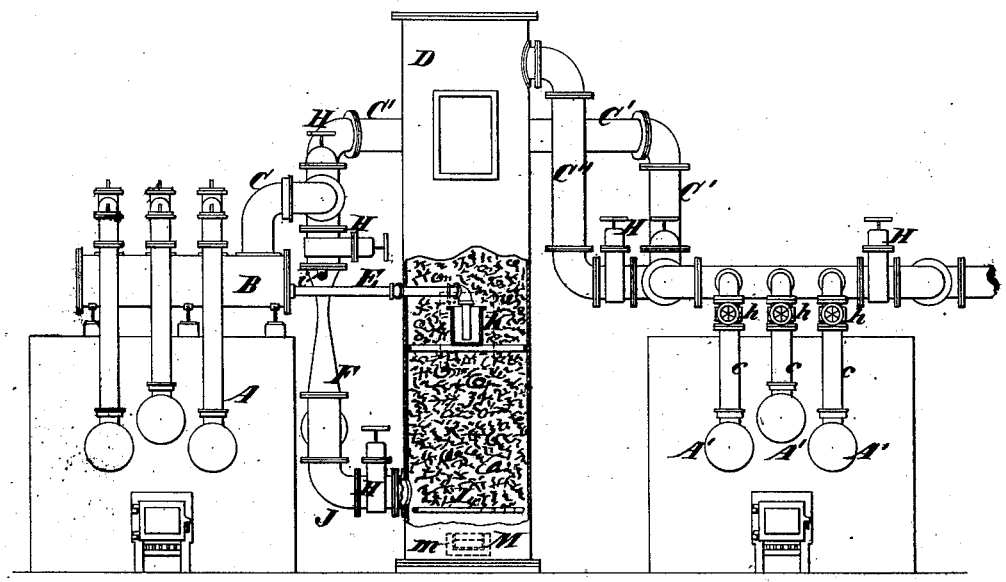

C. W. ISBELL.
Process and Apparatus for the Manufacture of Coal-Gas.

No. 214,042.    Patented April 8, 1879.

WITNESSES.
INVENTOR.
Charles W. Isbell
by his Attorneys
Brown + Allen

UNITED STATES PATENT OFFICE.

CHARLES W. ISBELL, OF NEW YORK, N. Y.

IMPROVEMENT IN PROCESSES AND APPARATUS FOR THE MANUFACTURE OF COAL-GAS.

Specification forming part of Letters Patent No. 214,042, dated April 8, 1879; application filed July 17, 1878.

*To all whom it may concern:*

Be it known that I, CHARLES W. ISBELL, of the city and State of New York, have invented an Improvement in Process and Apparatus for the Manufacture of Coal-Gas; and I do hereby declare that the following is a full, clear, and exact description of the same, reference being had to the accompanying drawings, forming a part of this specification.

In the distillation of coal for the production of illuminating-gas therefrom, there passes out of the retorts a permanent gas (or mixture of permanent gases) and vapors of substances that subsequently, in the hydraulic mains, assume the form of liquids and solids, or what will become solids as soon as the liquid substances which act as solvents are removed.

The principal hydrocarbons present in tar of the hydraulic mains are naphthaline, benzole, and naphtha. These contain elements that, under the treatment hereinafter described, may be converted into permanent illuminating-gas of good quality. These substances, with other volatile hydrocarbons, are intimately mixed with the resinous or bituminous or pitchy portion of the tar, and in the ordinary manufacture of illuminating-gas these hydrocarbons are not utilized as gas-making materials.

It is the object of the present invention to separate the naphthaline and other available hydrocarbons from the more solid portions of the tar, and to convert them into permanent illuminating-gas, which, after the usual or other approved process of purification, is passed on into the gas-mains for general consumption.

The invention consists, partly, in the process of taking the tar from the hydraulic main or mains of a bench or benches of retorts, and passing it through a steam-scrubber, wherein it is subjected to the direct and combined action of both the hot gas passed into said scrubber from the said retorts and of steam, which is also passed into the said scrubber with the said gas, whereby the aforesaid hydrocarbons (more especially naphthaline) are separated from the more solid parts of the tar and passed on into another retort or other retorts, wherein, by the action of heat, the said hydrocarbons are converted into permanent illuminating-gas, and wherefrom the entire volume of gas is passed on to other apparatus, to be purified in the ordinary or in any other approved manner.

The invention further consists in the combination, with the hydraulic main or mains, of retorts for the distillation of coal for the manufacture of coal-gas, a retort or retorts for the treatment by heat of the naphthaline and other hydrocarbons that collect in the said main, a steam-scrubber for separating the said hydrocarbons from the more solid portions of the tar drawn from the said main, and other devices, as more fully hereinafter set forth.

The invention also consists in the novel construction of a steam-scrubber for the purpose aforesaid, whereby its efficiency and convenience in use are secured.

Figure 2:
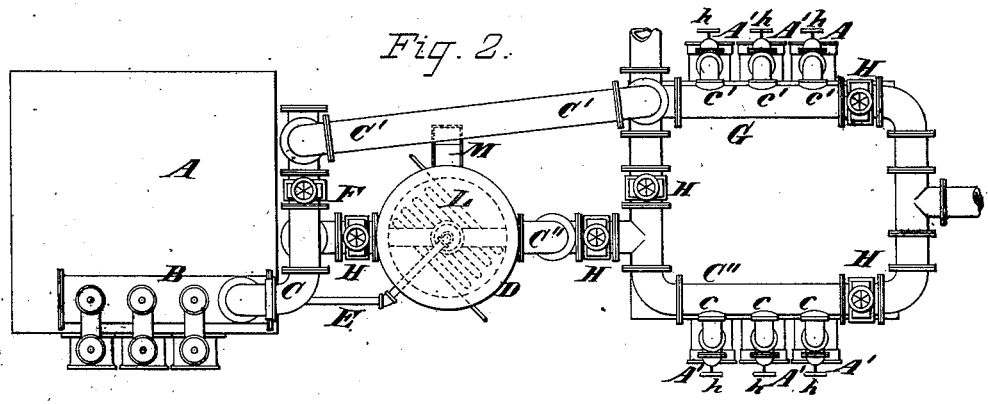
Figure 3:
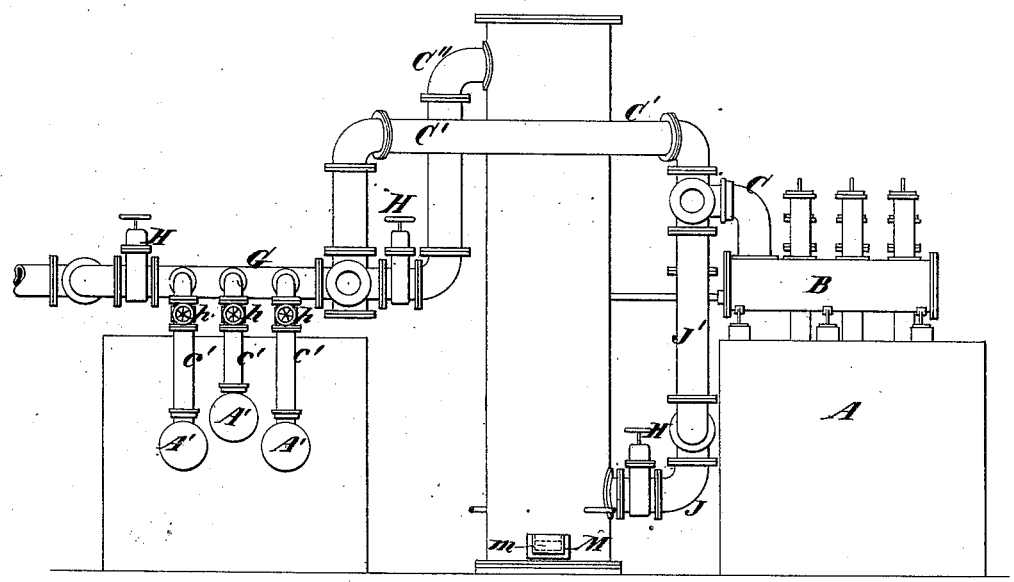

Figure 1 is a partial side view and a partial section of an apparatus constructed to carry out the herein-described process. Fig. 2 is a top or plan view of the same. Fig. 3 is a side view of the apparatus, seen from the opposite side from that represented in Fig. 1.

A represents a bench of retorts, in which coal may be distilled for the production of gas. B is the hydraulic main of the said bench of retorts, and C is a pipe for the conveyance or passage of the gaseous products to other parts of the apparatus hereinafter described. D is a steam-scrubber, the function of which is to separate and vaporize the naphthaline and other hydrocarbons from the tar drawn from the hydraulic main B.

The tar may be pumped or otherwise forced by artificial means from the hydraulic main to the steam-scrubber; but I prefer to so arrange the scrubber relatively to the main that the tar shall flow by its own gravity from the main to the scrubber.

C' is a by-pass, through which the entire gaseous product of the distillation of the coal may pass when desired for the cleaning of the said scrubber, or for any other purpose. C" is a pipe leading from the steam-scrubber to branches c, which connect the foregoing parts of the apparatus with retorts A'. Through the retorts A' the products separated from the tar in the scrubber are passed when the apparatus is in operation, and by the action of heat in the said retorts the said products are converted into permanent gas, as hereinafter more fully described. The gases pass from the retorts A', through pipes c', into the pipe G, which conveys it to other apparatus, where it is purified in the ordinary way, or in any other approved manner. The flow of the gas from retorts A through the various parts of the apparatus is controlled by various valves, H h, the use of which will be obvious without further description.

F is the steam-jet exhauster, the construction and use of which, being well known in the art, need not be minutely described herein. The gas passes from the retorts A', through pipes c', into the pipe G, through which it passes to other apparatus, where it is purified in the ordinary way, or in any other approved manner.

The steam-scrubber is a chamber preferably, but not necessarily, of cylindrical form, and having therein a receptacle, K, for receiving the tar to be treated in the scrubber from the pipe E. The said receptacle is preferably, but not necessarily, placed about at or a little below the middle of the cylinder, in the interior thereof. The space above and below the receptacle is filled with twigs or other material, producing an extensive divided surface, such as coke, shavings, &c., over which the tar flows. The latter is spread over a large surface, and most thoroughly exposed to the direct and combined action of the gas and steam that enter the scrubber through the pipe J. The steam and gas rising through the scrubber meet the down-flowing tar spread out over the extended surface of the twigs or other similar materials placed in the scrubber, as hereinbefore described, and the united action of the gas and steam upon the tar is to very thoroughly separate and vaporize the naphthaline and other hydrocarbons from the pitchy portion of the tar. The said hydrocarbons in passing through the hot retorts A' are converted into permanent illuminating-gas. The whole volume of gas is then passed on to other apparatus, as hereinbefore described, which completes its manufacture.

The separation of the naphthaline and other hydrocarbons from the pitchy portion of the tar is so complete that, in order to render the said pitchy portions fluid enough to remove the same from the bottom of the scrubber, I place a steam coil or pipe, L, in the lower part of the same, the heat of which melts the pitchy matter and allows it to flow out through an opening (shown in dotted outline in Figs. 1 and 3) into a receptacle, M, from which it is dipped from time to time, as circumstances may require.

I do not broadly claim the introduction of steam into gas for the purpose of scrubbing it and removing volatile matters therefrom. Neither do I broadly claim the diffusing or suspending in and through hydrogen, carbonic oxide, or other gases of low illuminating-power, the volatile hydrocarbons produced and ordinarily left in the tars resulting from the distillation of coal; but What I do claim as my invention, and desire to protect by Letters Patent, is as follows:

1. In the manufacture of coal-gas, the process herein described of separating and utilizing naphthaline and other hydrocarbons from the tar obtained by the distillation of coal through the direct and combined action upon the tar of the gas obtained from the coal in the distillation and free steam, and subsequently converting the separated hydrocarbons into permanent gas by the agency of heat, substantially as and for the purpose specified.

2. The combination, with the hydraulic main of a gas-retort or gas-retorts and a secondary retort or retorts for converting naphthaline and other hydrocarbons into permanent gas, of a steam-scrubber interposed between the said main and the secondary retort or retorts, a pipe for conveying tar from the said main to the said scrubber, a pipe or pipes and a steam-jet exhauster for conveying gas from the said main and steam into the said scrubber, and a pipe or pipes for conveying the separated and vaporized hydrocarbons into the secondary retort or retorts, substantially as and for the purpose described.

3. In an apparatus for the manufacture of coal-gas, the steam-scrubber herein described, consisting of a chamber, D, for the reception of tar, gas, and steam, a receptacle, K, for tar, a steam pipe or coil, L, in the lower part of the said chamber, twigs or other material which affords a similarly extensive divided surface placed in the chamber D above and below the receptacle K, an inlet for steam and gas, an outlet for the exit of the gas and separated hydrocarbons, and an outlet for the exit of the pitchy matters, substantially as and for the purpose set forth.

CHAS. W. ISBELL.

Witnesses:
T. J. KEANE,
A. BURHORN.